United States Patent
Sodeyama et al.

(10) Patent No.: US 12,030,186 B2
(45) Date of Patent: Jul. 9, 2024

(54) CONTROL DEVICE, CONTROL METHOD, AND NON-TRANSITORY COMPUTER READABLE STORAGE MEDIUM

(71) Applicant: SONY CORPORATION, Tokyo (JP)

(72) Inventors: Yoshinao Sodeyama, Tokyo (JP); Kazuo Hongo, Tokyo (JP); Kazuhito Wakana, Tokyo (JP); Yoshikazu Furiyama, Tokyo (JP)

(73) Assignee: SONY CORPORATION, Tokyo (JP)

(*) Notice: Subject to any disclaimer, the term of this patent is extended or adjusted under 35 U.S.C. 154(b) by 363 days.

(21) Appl. No.: 17/281,506

(22) PCT Filed: Sep. 2, 2019

(86) PCT No.: PCT/JP2019/034382
§ 371 (c)(1),
(2) Date: Mar. 30, 2021

(87) PCT Pub. No.: WO2020/075419
PCT Pub. Date: Apr. 16, 2020

(65) Prior Publication Data
US 2022/0040858 A1    Feb. 10, 2022

(30) Foreign Application Priority Data

Oct. 11, 2018   (JP) .................. 2018-192875

(51) Int. Cl.
*B25J 9/16* (2006.01)
*B25J 9/04* (2006.01)
*B25J 11/00* (2006.01)

(52) U.S. Cl.
CPC .............. *B25J 9/1664* (2013.01); *B25J 9/04* (2013.01); *B25J 9/1638* (2013.01); *B25J 9/1653* (2013.01);
(Continued)

(58) Field of Classification Search
CPC . B25J 9/1664; B25J 9/04; B25J 9/1638; B25J 9/1653; B25J 9/1679; B25J 11/0045;
(Continued)

(56) References Cited

U.S. PATENT DOCUMENTS

2016/0184037 A1* 6/2016 Cooper .................. A61B 34/30
606/130
2017/0323822 A1* 11/2017 Velazquez ......... H01L 21/67023
(Continued)

FOREIGN PATENT DOCUMENTS

| CA | 3029895 A | 1/2018 |
| CN | 109689308 A | 4/2019 |

(Continued)

OTHER PUBLICATIONS

International Search Report and Written Opinion of PCT Application No. PCT/JP2019/034382, dated Nov. 12, 2019, 13 pages of ISRWO.

*Primary Examiner* — Robert T Nguyen
(74) *Attorney, Agent, or Firm* — CHIP LAW GROUP

(57) ABSTRACT

A control device (120) according to the present application includes a limitation portion that is provided in a joint portion, which joins two or more links, of a robot and that physically limits motion of the links, and a control unit (122*f*) that limits movable ranges of the links by controlling the limitation portion corresponding to a predetermined joint portion on the basis of a task executed by the robot. With this configuration, it becomes possible to secure safety of when the robot executes a task.

10 Claims, 7 Drawing Sheets

(52) U.S. Cl.
CPC ........... *B25J 9/1674* (2013.01); *B25J 9/1679* (2013.01); *B25J 11/0045* (2013.01)

(58) Field of Classification Search
CPC .................... B25J 9/1674; B25J 9/101; G05B 2219/40202
See application file for complete search history.

(56) References Cited

U.S. PATENT DOCUMENTS

| | | | | |
|---|---|---|---|---|
| 2018/0009104 | A1* | 1/2018 | Vance | .................. B25J 9/1664 |
| 2018/0264644 | A1* | 9/2018 | Vance | ...................... B25J 9/101 |
| 2023/0136568 | A1* | 5/2023 | Fukuda | ................. B25J 13/085 |
| | | | | 700/260 |
| 2023/0390001 | A1* | 12/2023 | Bowling | ................ A61B 34/76 |

FOREIGN PATENT DOCUMENTS

| | | |
|---|---|---|
| EP | 3481602 A1 | 5/2019 |
| JP | 02-122792 U | 10/1990 |
| JP | 04-13285 U | 2/1992 |
| JP | 10-202574 A | 8/1998 |
| JP | 2003-275988 A | 9/2003 |
| JP | 2010-208002 A | 9/2010 |
| JP | 5035768 B2 | 9/2012 |
| JP | 2013-111718 A | 6/2013 |
| JP | 2015-174185 A | 10/2015 |
| JP | 2017-158645 A | 9/2017 |
| JP | 2018-43334 A | 3/2018 |
| JP | 2019-520227 A | 7/2019 |
| KR | 10-2019-0018023 A | 2/2019 |
| WO | 2018/009706 A1 | 1/2018 |

\* cited by examiner

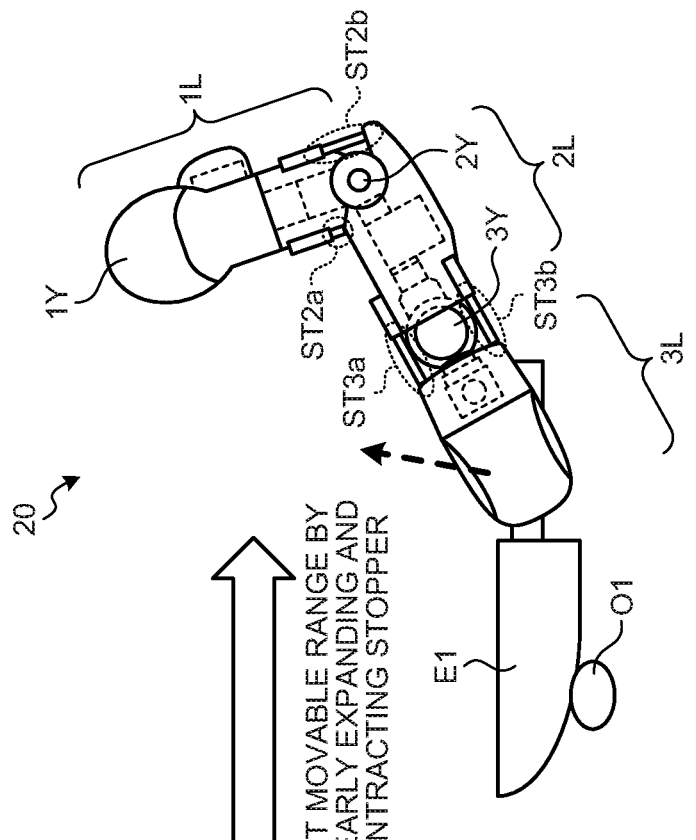
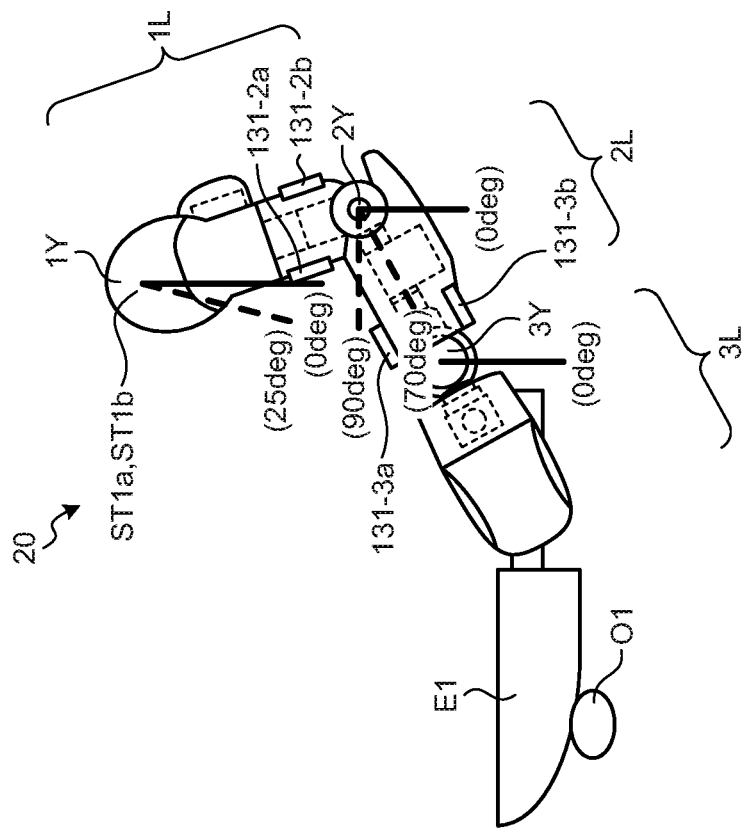

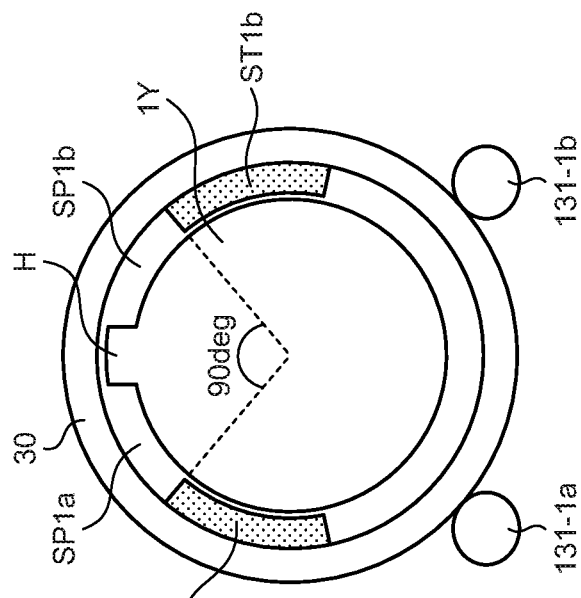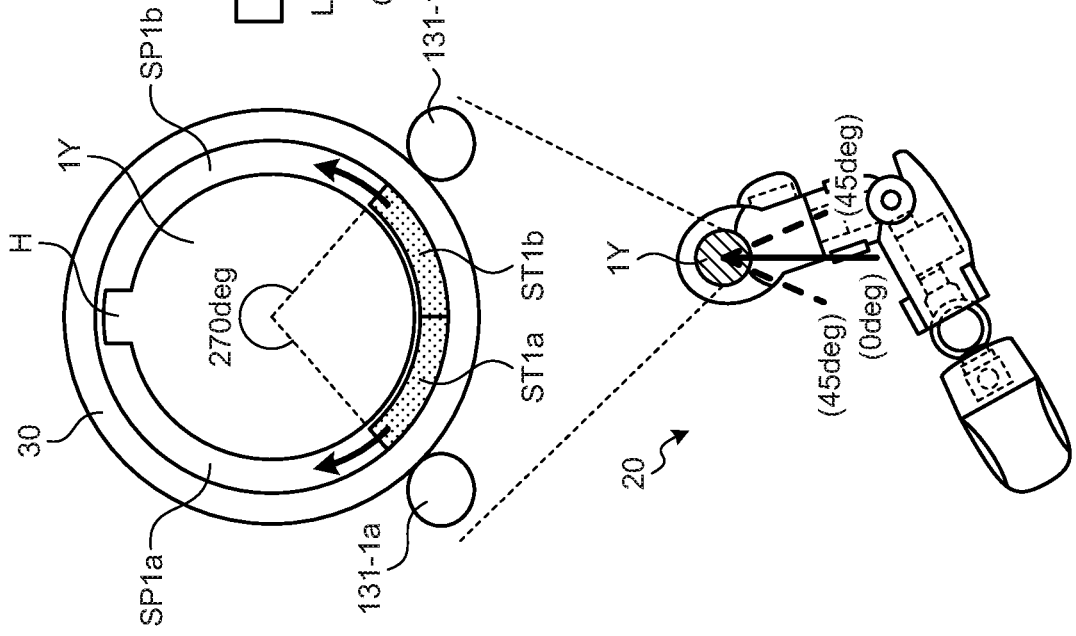

| TASK ID | TASK | MODE | ARM | PITCH | ROLL | YAW |
|---|---|---|---|---|---|---|
| T1 | TAKE VEGETABLE PLACED ON WORKING TABLE | INITIAL MODE | 1L(1Y) | -50deg to 180deg | 0deg to 0deg | 0deg to 0deg |
| | | | 2L(2Y) | 0deg to 120deg | 0deg to 0deg | 0deg to 0deg |
| | | | 3L(3Y) | -90deg to 90deg | 0deg to 0deg | 0deg to 0deg |
| T2 | CUT TAKEN VEGETABLE (CABBAGE) | MIDDLE MODE | 1L(1Y) | -10deg to 40deg | 0deg to 0deg | 0deg to 0deg |
| | | | 2L(2Y) | 70deg to 90deg | 0deg to 0deg | 0deg to 0deg |
| | | | 3L(3Y) | 0deg to 0deg | 0deg to 0deg | 0deg to 0deg |
| T3 | CUT TAKEN VEGETABLE (CARROT) | SMALL MODE | 1L(1Y) | 0deg to 25deg | 0deg to 0deg | 0deg to 0deg |
| | | | 2L(2Y) | 70deg to 90deg | 0deg to 0deg | 0deg to 0deg |
| | | | 3L(3Y) | 0deg to 0deg | 0deg to 0deg | 0deg to 0deg |
| T4 | PUT CUT VEGETABLE INTO BOWL | INITIAL MODE | 1L(1Y) | -50deg to 180deg | 0deg to 0deg | 0deg to 0deg |
| | | | 2L(2Y) | 0deg to 120deg | 0deg to 0deg | 0deg to 0deg |
| | | | 3L(3Y) | -90deg to 90deg | 0deg to 0deg | 0deg to 0deg |
| ⋮ | ⋮ | ⋮ | ⋮ | ⋮ | ⋮ | ⋮ |

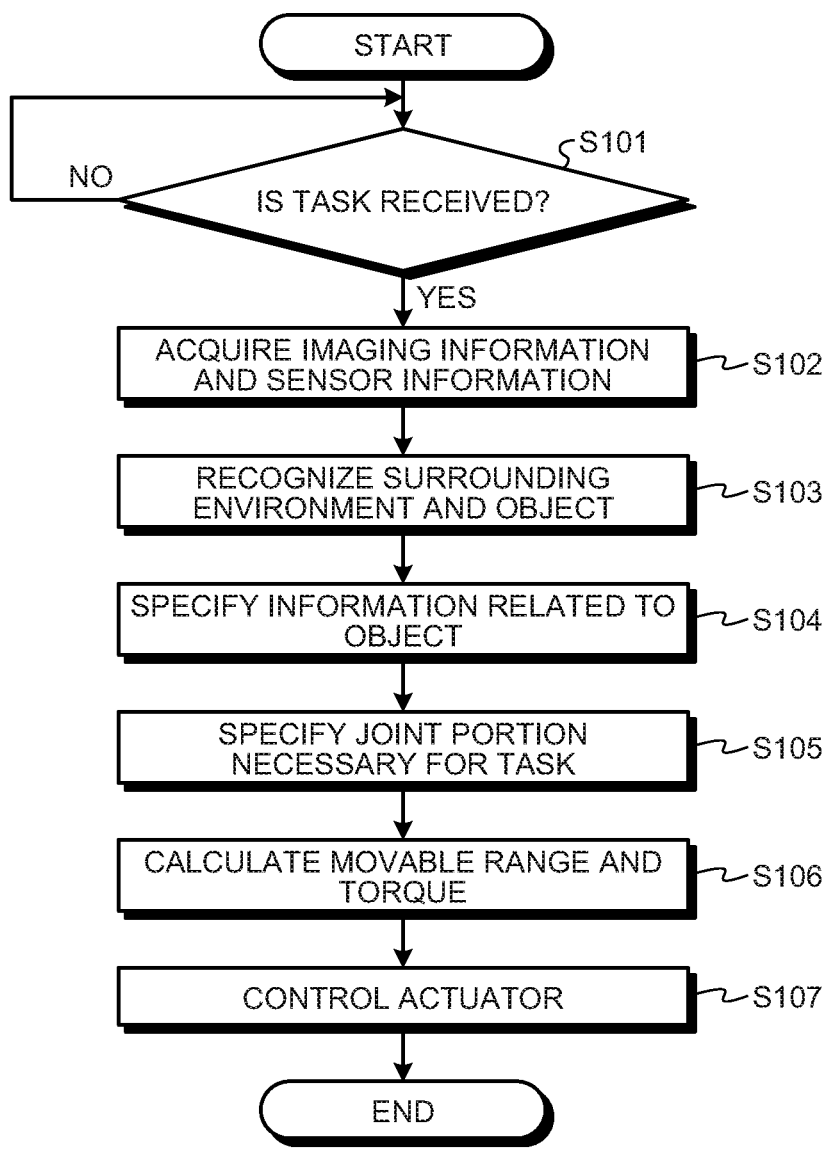

CONTROL DEVICE, CONTROL METHOD, AND NON-TRANSITORY COMPUTER READABLE STORAGE MEDIUM

CROSS REFERENCE TO RELATED APPLICATIONS

This application is a U.S. National Phase of International Patent Application No. PCT/JP2019/034382 filed on Sep. 2, 2019, which claims priority benefit of Japanese Patent Application No. JP 2018-192875 filed in the Japan Patent Office on Oct. 11, 2018. Each of the above-referenced applications is hereby incorporated herein by reference in its entirety.

FIELD

The present disclosure relates to a control device, a control method, and a non-transitory computer readable storage medium.

BACKGROUND

Recently, a robot that executes various tasks has been realized. For example, a robot that helps a human by carrying heavy baggage or performing cooking instead of the human has been realized.

For example, Patent Literature 1 discloses a technology of detecting an entry of a human, and stopping motion or limiting a speed of a robot on the basis of a signal. Also, Patent Literature 2 discloses a technology of stopping motion of a robot when a distance to an entering body becomes equal to or smaller than a predetermined distance.

Also, Patent Literature 3 discloses a technology in which a mechanical stopper swings and comes into contact with an elastic body and a movable range of a rotating body in a robot can be set beyond 360 degrees. Also, Patent Literature 4 discloses a device that is attached to a portion including a joint of a user and that assists a motion of the joint by limiting a movable range of the joint.

Also, Patent Literature 5 discloses a technology of relaxing a limit in movement due to a movable range of a joint in a robot including a multi-joint arm. Also, in Patent Literature 6, a technology in which a signal line is fixed at a reference point on a movable portion of a robot and a reference point of a movable range and the signal line is disconnected and the robot is stopped in an emergency in a case where the movable range is exceeded is disclosed.

CITATION LIST

Patent Literature

Patent Literature 1: JP 5035768 B2
Patent Literature 2: JP 2010-208002 A
Patent Literature 3: JP 2018-43334 A
Patent Literature 4: JP 2017-158645 A
Patent Literature 5: JP 2015-174185 A
Patent Literature 6: JP 2003-275988 A

SUMMARY

Technical Problem

However, in the above-described conventional technologies, it is not always possible to secure safety of when a robot executes a task.

Thus, the present disclosure proposes a control device, a control method, and a control program that can secure safety of when a robot executes a task.

Solution to Problem

According to one aspect of an embodiment, a control device includes a limitation portion that is provided in a joint portion, which joins two or more links, of a robot and that physically limits motion of the links. the control device includes a control unit that limits, on the basis of a task executed by the robot, movable ranges of the links by controlling the limitation portion corresponding to a predetermined joint portion.

BRIEF DESCRIPTION OF DRAWINGS

FIGS. 2A and 2B are views schematically illustrating a configuration of an entire arm of the present disclosure.

FIGS. 3A and 3B are views illustrating an example of structures of actuators and stoppers in a first joint portion of the present disclosure.

FIG. 5 is a view illustrating an example of a task information storage unit according to the embodiment of the present disclosure.

FIG. 7 is a flowchart illustrating an information processing procedure according to the embodiment of the present disclosure.

DESCRIPTION OF EMBODIMENTS

In the following, a mode for implementing a control device, a control method, and a non-transitory computer readable storage medium according to the present disclosure (hereinafter, referred to as "embodiment") will be described with reference to the drawings. Note that this embodiment does not limit a control device, a control method, and a non-transitory computer readable storage medium according to the present application. Also, in the following embodiments, the same reference sign is assigned to identical parts and an overlapped description thereof is omitted.

1. About Robot Device

Figure 1:
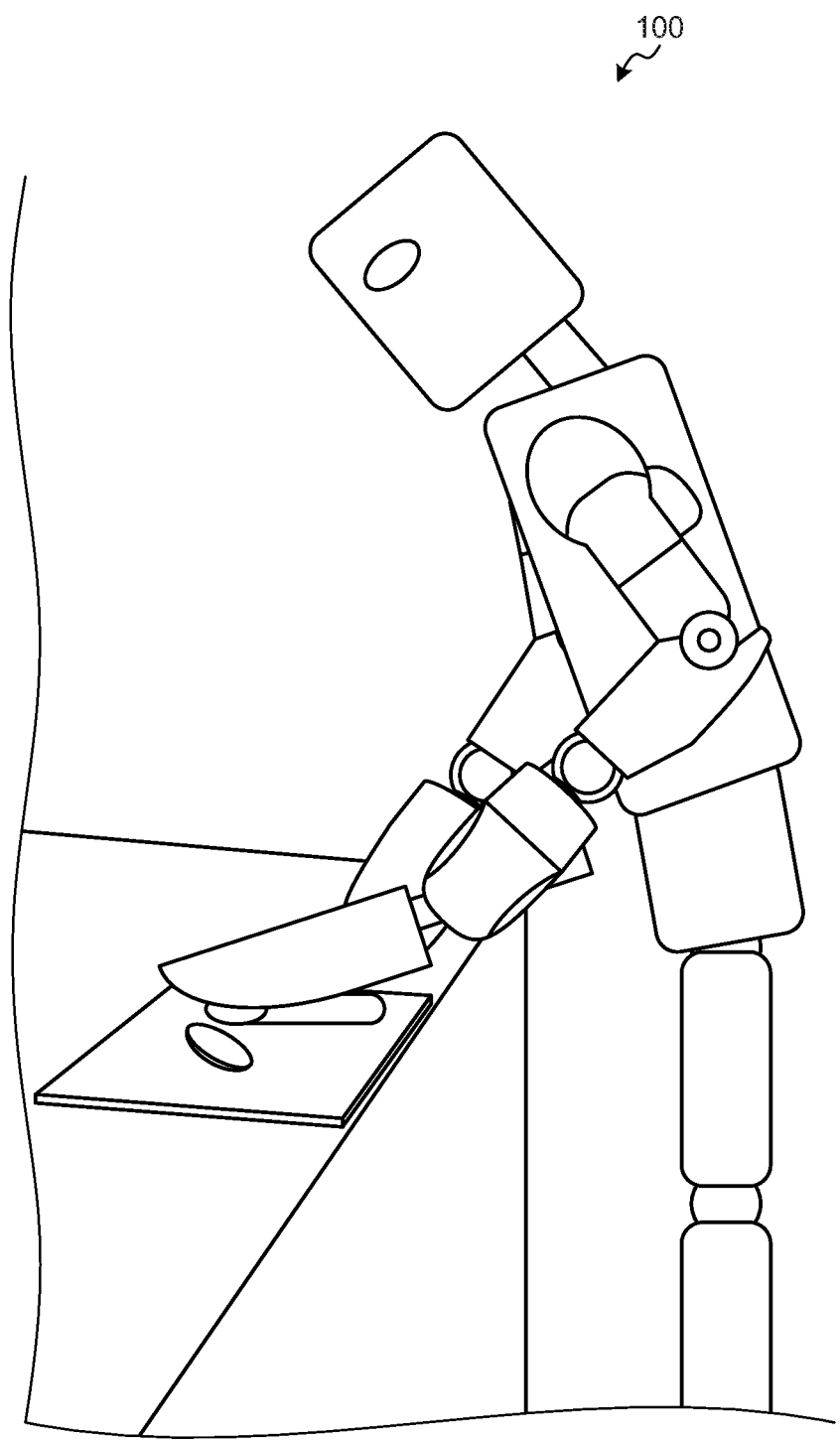
FIG. 1 is a view illustrating an example of an appearance of a robot device according to an embodiment of the present disclosure.

First, an outline of a robot device 100 according to an embodiment will be described with reference to FIG. 1. FIG. 1 is a view illustrating an example of an appearance of the robot device 100 according to the embodiment. FIG. 1 is a view illustrating the appearance of the robot device 100 capable of executing (applying) control processing according to the embodiment. The robot device 100 is a link structure in which a plurality of links is connected by joints, and each joint is moved by an actuator.

The robot device 100 is a humanoid in the example of FIG. 1, and the present embodiment focuses on motion control on a part, which includes an arm and hand in a human, among parts of this robot device 100. An overall structure of an arm of the robot device 100 includes an upper arm, a forearm, and a hand (palm) similarly to a human. Also, the upper arm, forearm, and hand are connected by joints. The upper arm, forearm, and hand correspond to the links described above. Thus, a link will be referred to as an "arm" in the following embodiment. Also, a joint corresponds to a joint portion that joins two or more links (such as an arm corresponding to the upper arm and an arm corresponding to the forearm).

The robot device 100 is mainly used at home to perform household chores and the like, but can be also used for various industrial purposes. In the example of FIG. 1, since receiving a task such as "cutting a vegetable", the robot device 100 places an object (vegetable) on a working table, presses the object with a right hand, and cuts the object with an instrument (kitchen knife) held in a left hand.

Here, a premise of control processing according to the embodiment will be described. For example, when the robot device 100 executes various tasks including the above task, there is a problem from a viewpoint of safety. For example, when the robot device 100 executes a task, it is often necessary to carry an object or to execute the task by using various instruments.

For example, when the robot device 100 performs cooking work, there are an article conveyance task such as "taking out a foodstuff from an upper row of a refrigerator and carrying the taken foodstuff to a working space of a kitchen" and a foodstuff editing task such as "cutting a vegetable on a chopping block". In the article conveyance task, the robot device 100 needs to grip an article. However, depending on weight of a carried article, there is a risk that torque at the time of gripping is insufficient and the article is dropped.

Also, in the foodstuff editing task, the robot device 100 cuts a foodstuff by using a kitchen knife. However, for example, in a case where the foodstuff is hard, there is a risk that torque for pushing a blade into the foodstuff is weaker than a reaction from the foodstuff and the blade faces a wrong direction. There is also a risk that the robot device 100 drops the kitchen knife.

Also, in order to prevent generation of the above-described high-risk situation, motion of the robot device 100 is controlled by built-in software, for example. However, some kind of error may be generated in the software itself, and the robot device 100 may make a dangerous motion due to the error.

Thus, in order to reduce a risk and cause the robot device 100 to make highly safe motion, it is necessary to physically limit a motion of the robot device 100 while controlling the robot device 100 with software in preparation for a situation that is difficult to be prevented with the software (for example, an article is suddenly dropped or a cutting edge of a kitchen knife suddenly faces a person). Specifically, it is necessary to limit a movable range of the robot device 100 without control by the software. For example, in order to execute the above tasks, the robot device 100 needs to make full use of an arm. Thus, it is necessary to physically limit the movable range of the arm without the control by the software. Here, for example, physically limiting the movable range of the arm means locking the arm, which tries to move beyond the movable range, by causing a body made of a specific material (such as a metal material) to come into contact with the arm in such a manner that the arm does not move unexpectedly beyond the movable range controlled by the software. Note that a body made of a specific material, that is, a body used to lock the arm may be referred to as a "stopper" in the following.

In order to solve such a premise and a problem, a control device 120 according to the embodiment performs the following control processing. Specifically, with a limitation portion that is provided in a joint portion, which joins two or more links, of a robot and that physically limits motion of the links, the control device 120 limits movable ranges of the links by controlling a limitation portion corresponding to a predetermined joint portion on the basis of a task executed by the robot. Note that the links correspond to arms of the robot device 100, that is, the arms. Also, although being described later with reference to FIGS. 2A and 2B, the control device 120 physically limits a movable range of an arm by controlling a stopper attached to a joint portion that joins arms. More specifically, the control device 120 limits a movable range of an arm by controlling a stopper via an actuator attached to a joint portion.

For example, in the article conveyance task, a wide movable range is necessary as the movable range. However, a degree of risk as a task is relatively low because a high-risk instrument such as a kitchen knife is not used. On the one hand, in the foodstuff editing task, it is necessary to use a high-risk instrument such as a kitchen knife that is an edged tool. Thus, a degree of risk as a task is high. In such a manner, performance required for the robot device 100 varies depending on a task. Thus, as control processing according to the embodiment, the control device 120 controls an actuator mounted on each joint portion of an arm to adjust a position of a stopper, for example. For example, by giving parameters such as a movable range of the arm and torque to the actuator, the control device 120 controls the actuator to adjust the position of the stopper on the basis of these parameters.

2. Configuration of arm

Next, a configuration of an arm according to the embodiment will be described with reference to FIGS. 2A, 2B, 3A and 3B. FIGS. 2A and 2B are views schematically illustrating a configuration of an entire arm. An arm 20 illustrated in FIG. 2A corresponds to an arm on a left side (left arm) of the robot device 100. The arm 20 includes a first arm 1L corresponding to an upper left arm of a human (example of a first link), a second arm 2L corresponding to a left forearm of the human (example of a second link), and a third arm 3L corresponding to a palm of the left arm of the human (example of a third link).

Also, the arm 20 includes a first joint portion 1Y that joins the first arm 1L and a body of the robot device 100, a second joint portion 2Y that joins the first arm 1L and the second arm 2L, and a third joint portion 3Y that joins the second arm 2L and the third arm 3L. Also, from the above, the first arm 1L is a link connecting the first joint portion 1Y and the second joint portion 2Y, the second arm 2L is a link connecting the second joint portion 2Y and the third joint portion 3Y, and the third arm 3L is linked to the third joint portion 3Y.

Also, an actuator is mounted on each of the above joints, and each joint is rotationally driven in a predetermined direction by the actuator. Then, in response to this drive, each arm is also rotationally driven in a predetermined direction. Although being described later with reference to FIGS. 3A and 3B, the first joint portion 1Y is driven by two actuators that rotate around a pitch axis, specifically, an actuator 131-1*a* and an actuator 131-1*b*. In the following embodiment, in a case where it is not necessary to distinguish the actuator 131-1a and the actuator 131-1b from each other, these are collectively referred to as "pitch axis actuators 131-1".

Also, the second joint portion 2Y is driven by two actuators that rotate around the pitch axis, specifically, an actuator 131-2a and an actuator 131-2b. In the following embodiment, in a case where it is not necessary to distinguish the actuator 131-2a and the actuator 131-2b from each other, these are collectively referred to as "pitch axis actuators 131-2".

Note that the second joint portion 2Y is driven not only around the pitch axis but also around a roll axis and a yaw axis by actuators. Thus, two actuators that rotate around the roll axis and two actuators that rotate around the yaw axis may be further mounted on the second joint portion 2Y. Also, the pitch axis actuators 131-2 may also serve as actuators corresponding to these rotation directions.

Also, the third joint portion 3Y is driven by two actuators that rotate around the pitch axis, specifically, an actuator 131-3a and an actuator 131-3b. In the following embodiments, in a case where it is not necessary to distinguish the actuator 131-3a and the actuator 131-3b from each other, these are collectively referred to as "pitch axis actuators 131-3".

Note that the third joint portion 3Y is driven not only around the pitch axis but also around the roll axis and the yaw axis by actuators. Thus, two actuators that rotate around the roll axis and two actuators that rotate around the yaw axis may be further mounted on the third joint portion 3Y. Also, the pitch axis actuators 131-3 may also serve as actuators corresponding to these rotation directions.

Next, the pitch axis actuators 131-1, the pitch axis actuators 131-2, and the pitch axis actuators 131-3 will be described. Since functions of the actuators are common, the pitch axis actuators 131-1 will be described as an example. An encoder to measure a joint angle, a motor to generate torque, a current control-type motor driver to drive the motor, and a reducer to acquire sufficient generated force are attached to each of the pitch axis actuators 131-1. Also, a microcomputer (control unit) that performs drive control of an actuator is also provided in the pitch axis actuator 131-1. These are not illustrated.

Also, a stopper that is a limitation portion to physically limit a motion of an arm is mounted on each of the pitch axis actuators 131-1, the pitch axis actuators 131-2, and the pitch axis actuators 131-3.

For example, according to the example of FIGS. 3A and 3B, two stoppers that lock the first arm 1L by rotating around the pitch axis, specifically, a stopper ST1a and a stopper ST1b are built in the pitch axis actuators 131-1. Specifically, the stopper ST1a and the stopper ST1b that physically lock rotational movement of the first arm 1L around the pitch axis by rotating around the pitch axis are built in the pitch axis actuators 131-1.

In the example of FIG. 3(a), the stopper ST1a is built in the actuator 131-1a. Thus, the actuator 131-1a controls the stopper ST1a according to control processing by the control device 120. Specifically, the actuator 131-1a rotationally moves the stopper ST1a around the pitch axis in such a manner that the stopper ST1a physically locks rotational movement of the first arm 1L around the pitch axis. Also, the stopper ST1b is built in the actuator 131-1b. Thus, the actuator 131-1b controls the stopper ST1b according to control processing by the control device 120. Specifically, the actuator 131-1b rotationally moves the stopper ST1b around the pitch axis in such a manner that the stopper ST1b physically locks rotational movement of the first arm 1L around the pitch axis.

Returning to FIGS. 2A and 2B, two stoppers that lock the second arm 2L by expanding and contracting linearly, specifically, a stopper ST2a and a stopper ST2b are built in the pitch axis actuators 131-2. Specifically, the stopper ST2a and the stopper ST2b that physically lock rotational movement of the second arm 2L around the pitch axis by expanding and contracting linearly are built in the pitch axis actuators 131-2.

According to the example of FIG. 2B, the stopper ST2a is built in the actuator 131-2a. Thus, the actuator 131-2a controls the stopper ST2a according to the control processing by the control device 120. Specifically, the actuator 131-2a linearly expands and contracts the stopper ST2a in such a manner that the stopper ST2a physically locks the rotational movement of the second arm 2L around the pitch axis. Also, the stopper ST2b is built in the actuator 131-2b. Thus, the actuator 131-2b controls the stopper ST2b according to the control processing by the control device 120. Specifically, the actuator 131-2b linearly expands and contracts the stopper ST2b in such a manner that the stopper ST2b physically locks the rotational movement of the second arm 2L around the pitch axis.

Note that stoppers that physically lock rotational movement of the second arm 2L around the roll axis and the yaw axis by rotating around the roll axis and the yaw axis may be built in the pitch axis actuators 131-2. Also, the stopper that physically locks the rotational movement of the second arm 2L around the roll axis may be controlled by another actuator (such as a pitch axis actuator) mounted on the second joint portion 2Y. Also, the stopper that physically locks the rotational movement of the second arm 2L around the yaw axis may be controlled by another actuator (such as a yaw axis actuator) mounted on the second joint portion 2Y.

Also, what rotates and moves like the stopper ST1a (or stopper ST1b) is preferable as the stopper that physically locks the rotational movement of the second arm 2L around the roll axis. Also, what expands and contracts linearly is preferable as the stopper that physically locks the rotational movement of the second arm 2L around the yaw axis.

Also, two stoppers to lock the third arm 3L by expanding and contracting linearly, specifically, a stopper ST3a and a stopper ST3b are built in the pitch axis actuators 131-3. Specifically, the stopper ST3a and the stopper ST3b that physically lock rotational movement of the third arm 3L around the pitch axis by expanding and contracting linearly are built in the pitch axis actuators 131-3.

According to the example of FIG. 2B, the stopper ST3a is built in the actuator 131-3a. Thus, the actuator 131-3a controls the stopper ST3a according to the control processing by the control device 120. Specifically, the actuator 131-3a linearly expands and contracts the stopper ST3a in such a manner that the stopper ST3a physically locks rotational movement of the third arm 3L around the pitch axis. Also, the stopper ST3b is built in the actuator 131-3b. Thus, the actuator 131-3b controls the stopper ST3b according to the control processing by the control device 120. Specifically, the actuator 131-3b linearly expands and contracts the stopper ST3a in such a manner that the stopper ST3b physically locks rotational movement of the second arm 2L around the pitch axis.

Note that stoppers that physically lock rotational movement of the third arm 3L around the roll axis and the yaw axis by rotating around the roll axis and the yaw axis may be built in the pitch axis actuators 131-3. Also, the stopper that physically locks the rotational movement of the third arm 3L around the roll axis may be controlled by another actuator (such as a pitch axis actuator) mounted on the third joint portion 3Y. Also, the stopper that physically locks the rotational movement of the third arm 3L around the yaw axis may be controlled by another actuator (such as a yaw axis actuator) mounted on the third joint portion 3Y.

Also, what rotates and moves like the stopper ST1a (or stopper ST1b) is preferable as the stopper that physically locks the rotational movement of the third arm 3L around the roll axis. Also, what expands and contracts linearly is preferable as the stopper that physically locks the rotational movement of the third arm 3L around the yaw axis.

Here, as mentioned a little above, the pitch axis actuators 131-1 and stoppers controlled by the pitch axis actuators 131-1 will be described in detail with reference to FIGS. 3A and 3B. FIGS. 3A and 3B are views illustrating an example of structures of actuators and stoppers in a first joint portion.

An arm 20 illustrated in a lower part of FIG. 3A is similar to that illustrated in FIGS. 2A and 2B. Then, an actuator 131-1a rotationally moves a stopper ST1a around a pitch axis in such a manner that the stopper ST1a physically locks rotational movement of a first arm 1L around the pitch axis. Also, an actuator 131-1b rotationally moves the stopper ST1b around the pitch axis in such a manner that a stopper ST1b physically locks the rotational movement of the first arm 1L around the pitch axis.

Also, a shape of a first joint portion 1Y is, for example, a columnar shape. A cut surface of this columnar first joint portion 1Y is illustrated in each of FIG. 3A and FIG. 3B. Then, the first joint portion 1Y has a latch H at the uppermost portion. Also, the first joint portion 1Y is covered with an outer shell portion 30. In such a manner, since the first joint portion 1Y has the latch H and is covered with the outer shell portion 30, a groove-like structure (cavity structure) is created between the stopper and the latch H. For example, a groove-like structure SP1a is formed by the stopper ST1a and the latch H. Also, for example, a groove-like structure SP1b is formed by the stopper ST1b and the latch H.

Also, in FIG. 3A, the stopper ST1a and the stopper ST1b are not rotationally moved and are at positions in an initial state. In the initial state, the stopper ST1a and the stopper ST1b are kept still in a state of being overlapped in a lower part of the first joint portion 1Y. With the groove-like structure SP1a and the groove-like structure SP1b formed respectively by a positional relationship between the stopper ST1a and the latch H and a positional relationship between the stopper ST1b and the latch H at this time, it is assumed that a degree of freedom of rotation in which the first joint portion 1Y can be rotated is "270 deg". In such a state, the actuator 131-1a can rotate the first arm 1L clockwise by "135 deg". Also, the actuator 131-1b can rotate the first arm 1L counterclockwise by "135 deg".

In such a state, it is assumed that the pitch axis actuator 131-1 is controlled by the control device 120 in such a manner as to limit a movable range of the first arm 1L to "−45 deg to 45 deg" by rotationally moving the stoppers ST1a and ST1b. In such a case, the actuator 131-1a moves a position of the stopper ST1a from a state of FIG. 3(a) to a state of FIG. 3(b) by rotating the stopper ST1a clockwise. Thus, a width of the groove-like structure SP1a is narrowed, and the first arm 1L can be rotated clockwise only by 45 deg for an amount of the groove-like structure SP1a having a width corresponding to 45 deg (45 deg clockwise). For example, even when force to rotate the first arm 1L clockwise by 45 deg or more is applied from the outside in a task, the stopper ST1a and the latch H collide with each other and the first arm 1L cannot rotate clockwise beyond 45 deg. Thus, the actuator 131-1a limits the movable range of the first arm 1L by locking the first arm 1L with an action of the stopper ST1a and the latch H forming the groove-like structure SP1a.

Also, the actuator 131-1b moves a position of the stopper ST1b from a state of FIG. 3A to a state of FIG. 3B by rotating the stopper ST1b counterclockwise. Thus, a width of the groove-like structure SP1b is narrowed, and the first arm 1L can be rotated counterclockwise only by 45 deg for an amount of the groove-like structure SP1b having a width corresponding to −45 deg (45 deg counterclockwise). For example, even when force to rotate the first arm 1L counterclockwise by 45 deg or more is applied from the outside in a task, the stopper ST1b and the latch H collide with each other and the first arm 1L cannot rotate counterclockwise beyond 45 deg. Thus, the actuator 131-1b limits the movable range of the first arm 1L by locking the first arm 1L with an action of the stopper ST1b and the latch H forming the groove-like structure SP1b.

3. Configuration of robot device

Figure 4:
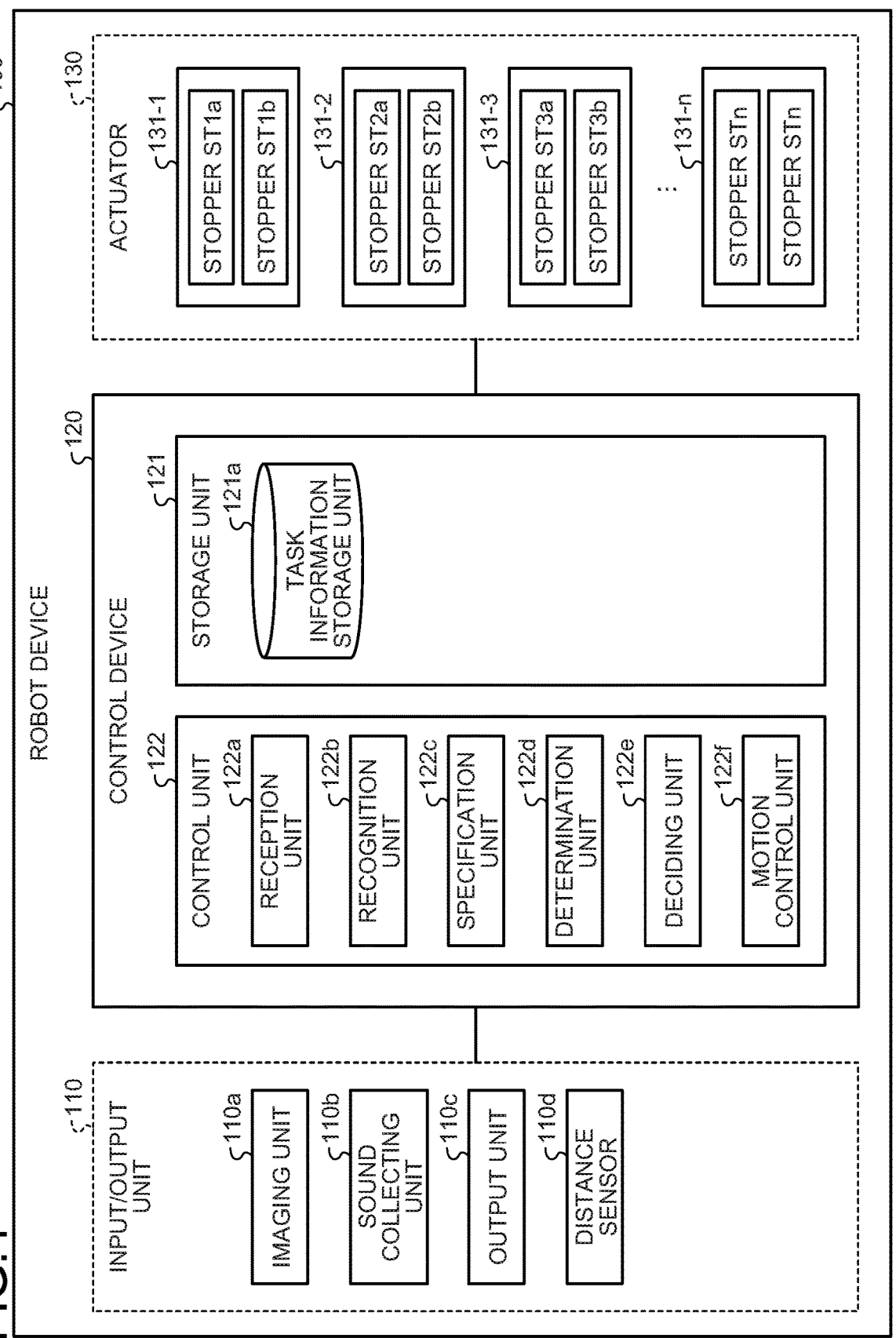
FIG. 4 is a view schematically illustrating a functional configuration to control the robot device according to the embodiment of the present disclosure.

Next, a configuration of the robot device 100 according to the embodiment will be described with reference to FIG. 4. FIG. 4 is a view schematically illustrating a functional configuration to control the robot device 100 according to the embodiment. The robot device 100 includes an input/output unit 110, a control device 120 that performs control processing to cause an actuator 130 to perform processing such as what is described with reference to FIGS. 2A, 2B, 3A, and 3B, and the actuator 130. Note that the actuator 130 can be rephrased as a driving unit 130 since being a processing unit that directly controls a motion of the arm 20.

(About Input/Output Unit 110)

As illustrated in FIG. 4, the input/output unit 110 includes an imaging unit 110a, a sound collecting unit 110b, an output unit 110c, and a distance sensor 110d, and realizes or executes a function or an action of information processing described in the following. Note that an internal configuration of the input/output unit 110 is not limited to the configuration illustrated in FIG. 4, and may be another configuration as long as being a configuration of performing information processing described later. Also, a connection relationship of each processing unit included in the input/output unit 110 is not limited to a connection relationship illustrated in FIG. 4, and may be another connection relationship.

(About Imaging Unit 110a)

The imaging unit 110a images a surrounding environment of the robot device 100. For example, in a case where the robot device 100 is a humanoid robot such as what is illustrated in FIG. 1, the imaging unit 110a corresponds to eyes of the robot device 100. Also, the imaging unit 110a transmits imaging information acquired by imaging (environmental information indicating the surrounding environment) to the control device 120.

(About Sound Collecting Unit 110b)

The sound collecting unit 110b collects an environmental sound of the surrounding environment. For example, in a case where the robot device 100 is a humanoid robot such as what is illustrated in FIG. 1, the sound collecting unit 110b corresponds to ears of the robot device 100. Also, the sound collecting unit 110b transmits sound information acquired by sound collection to the control device 120.

(About Output Unit 110c)

The output unit 110c outputs predetermined information. For example, in a case where a recognition unit 122b (described later) recognizes that there is a person in a predetermined range centered on the robot device 100 or a case where the robot device 100 uses a high-risk instrument (such as a kitchen knife), the output unit 110c outputs what indicates danger to the person. For example, the output unit 110c may output such information by sound, or may cause a display unit (such as a display device) to display such information in a case where the robot device 100 includes the display unit. For example, in a case where the robot device 100 is a humanoid robot such as what is illustrated in FIG. 1, the output unit 110c corresponds to a mouth of the robot device 100.

(About Distance Sensor 110d)

The distance sensor 110d detects a distance to a person or an obstacle. For example, the distance sensor 110d detects a distance to a person or an obstacle on the basis of the imaging information from the imaging unit 110a. Also, the distance sensor 110d transmits the detected distance to the control device 120.

(About Control Device 120)

The control device 120 is a device that performs control processing according to the embodiment. Specifically, on the basis of a task executed by the robot device 100, the control device 120 limits a movable range of an arm by controlling a stopper corresponding to a joint portion corresponding to the task. As illustrated in FIG. 4, the control device 120 includes a storage unit 121 and a control unit 122.

(About Storage Unit 121)

The storage unit 121 is realized by a semiconductor memory element such as a random access memory (RAM) or a flash memory, or a storage device such as a hard disk or an optical disk, for example. The storage unit 121 has a task information storage unit 121a.

(About Task Information Storage Unit 121a)

The task information storage unit 121a stores information related to a movable range corresponding to a task. Here, an example of the task information storage unit 121a according to the embodiment is illustrated in FIG. 5. In the example of FIG. 5, the task information storage unit 121a has items such as a "task ID", "task", "mode", "arm", "pitch", "roll", and "yaw".

The "task ID" indicates identification information that identifies a task. The "task" indicates contents of a task identified by the "task ID". The "mode" is a mode of motion of the robot device 100 (more specifically, arm 20), and indicates a mode corresponding to a movable range. In short, in a case where it is indicated which mode of the robot device 100 causes a motion to be controlled in which movable range when being set, the "mode" indicates this mode.

In arms 20 illustrated in FIGS. 2A and 2B, the "arm" indicates an arm a movable range of which needs to be controlled in execution of the task identified by the "task ID".

Here, in the present embodiment, the movable range is a range of a rotation angle in a rotation around each of three rotation axes such as a pitch axis, a roll axis, and a yaw axis. Thus, the "pitch" indicates a rotation angle range of a rotation around the pitch axis (pitching). Also, the "roll" indicates a rotation angle range of a rotation around the roll axis (rolling). Also, the "yaw" indicates a rotation angle range of a rotation around the yaw axis (yawing).

That is, in the example of FIG. 5, an example in which a task identified by a task ID "T1" is a task having contents "taking a vegetable placed on a working table" is illustrated. Also, in the example of FIG. 5, an example in which a control mode is set to an "initial mode" and a movable range of the first arm 1L around the pitch axis is limited to "−50 deg to 180 deg" by controlling of a stopper corresponding to the first joint portion 1Y in a case where the robot device 100 is instructed to perform the task identified by the task ID "T1" is illustrated. Also, a designated example in which a control mode is set to an "initial mode" and a movable range of the first arm 1L around the roll axis is limited to "0 deg to 0 deg" by controlling of a stopper corresponding to the first joint portion 1Y is illustrated. Also, a designated example in which a control mode is set to an "initial mode" and a movable range of the first arm 1L around the yaw axis is limited to "0 deg to 0 deg" by controlling of a stopper corresponding to the first joint portion 1Y is illustrated. Note that the movable range "0 deg to 0 deg" means that the first arm 1L is completely locked by a stopper in such a manner as not to rotate at all in the rotation direction.

Returning to FIG. 4, the control unit 122 is realized when various programs stored in a storage device inside the control device 120 are executed by a central processing unit (CPU), a micro processing unit (MPU), or the like with a RAM as a work area. Also, the control unit 122 is realized by, for example, an integrated circuit such as an application specific integrated circuit (ASIC) or a field programmable gate array (FPGA).

As illustrated in FIG. 4, the control unit 122 includes a reception unit 122a, a recognition unit 122b, a specification unit 122c, a determination unit 122d, a deciding unit 122e, and a motion control unit 122f, and realizes or execute a function or an action of information processing described in the following. Note that an internal configuration of the control unit 122 is not limited to the configuration illustrated in FIG. 4, and may be another configuration as long as being a configuration of performing information processing described later. Also, a connection relationship of each processing unit included in the control unit 122 is not limited to the connection relationship illustrated in FIG. 4, and may be another connection relationship.

(About Reception Unit 122a)

The reception unit 122a receives a task. For example, the reception unit 122a receives a task from a user of the robot device 100. For example, in a case where the user utters contents of the task to the robot device 100, the reception unit 122a receives utterance information indicating the contents of the task. Also, for example, in a case where the user inputs a task ID corresponding to the contents of the task into the robot device 100, the reception unit 122a receives the task ID. Note that the user can directly input a task into the robot device 100, or can input a task via a network by using a predetermined terminal device (such as a personal computer or smartphone).

(About Recognition Unit 122b)

The recognition unit 122b recognizes environment around the robot device 100 on the basis of information acquired from an input unit such as the imaging unit 110a, the sound collecting unit 110b, or the distance sensor 110d in the input/output unit 110. Also, the recognition unit 122b transmits the recognized environmental information to the specification unit 122c.

(About Specification Unit 122c)

The specification unit 122c specifies a parameter necessary for the robot device 100 to execute a task. For example, the specification unit 122c specifies, as a parameter, information related to an object to be a target of the task. For example, the specification unit 122c specifies, as the information related to an object to be a target of the task, at least a name of the object, size of the object, strength of the object, rigidity of the object, weight of the object, and a target value for the object (such as how deep carrot is to be cut (example of the target value)). For example, in a case where a task such as "cutting carrot" is given, the object is "carrot". For example, in a case where a task is received by the reception unit 122a, the specification unit 122c specifies a parameter necessary for the robot device 100 to execute the task.

Also, on the basis of the task, the specification unit 122c specifies a joint portion that needs to be operated to execute the task among joint portions included in the robot device 100. For example, on the basis of information related to an object to be a target of a task, the specification unit 122c specifies a joint portion that needs to be operated to execute the task among the joint portions included in the robot device 100. Here, the information related to the object is the above-described parameter.

Also, on the basis of the task, the specification unit 122c calculates (specifies) a movable range necessary to execute the task with respect to a link corresponding to the specified joint portion, that is, an arm 20. For example, on the basis of the information related to the object to be the target of the task, the specification unit 122c calculates (specifies) a movable range necessary to execute the task with respect to the link corresponding to the specified joint portion, that is, the arm 20. Here, the information related to the object is the above-described parameter.

Also, the specification unit 122c calculates (specifies) torque necessary to execute the task. For example, the specification unit 122c calculates (specifies) the torque necessary to execute the task on the basis of the information (parameter) related to the object to be the target of the task. For example, when a task such as "cutting carrot" is given, the specification unit 122c calculates torque necessary to cut the carrot. For example, the specification unit 122c calculates the torque necessary to cut the carrot on the basis of strength, rigidity, weight, and the like of the carrot.

The specification unit 122c can also calculate a movable range while further considering a surrounding environment of the robot device 100 of when the task is performed. For example, the specification unit 122c calculates the movable range on the basis of the environmental information recognized by the recognition unit 122b. Thus, for example, in a case where there is a person in the vicinity of the robot device 100 and the robot device 100 uses a high-risk instrument or the like in the task, the control device 120 can calculate a movable range and torque in a range in which there is no effect on the person and the task can be executed. As a result, the control device 120 can secure safety for the surroundings of when the robot device 100 executes the task.

The specification unit 122c can also calculate a movable range on the basis of a risk determined by the determination unit 122d (described later), that is, a risk of when the task is performed. For example, in a case where the determination unit 122d determines that the task has a risk equal to or higher than a predetermined value, for example, when the robot device 100 uses an edged tool in the task, the specification unit 122c calculates a movable range narrower than a movable range to be a certain standard. Thus, even in a case where the robot device 100 uses a high-risk instrument such as an edged tool during a task, the robot device 100 can use this instrument only in a limited narrow region. Thus, the control device 120 can control a risk to a person in surroundings at a minimum.

Also, on the basis of a task, the specification unit 122c specifies a joint portion necessary for the task among the first joint portion 1Y, the second joint portion 2Y, and the third joint portion 3Y when the examples of FIGS. 2A, 2B, 3A, and 3B are used. For example, in a case where of specifying that all of the first joint portion 1Y, the second joint portion 2Y, and the third joint portion 3Y are necessary, on the basis of the task, the specification unit 122c specifies a first movable range with respect to the first arm 1L that links the first joint portion 1Y and the second joint portion 2Y, specifies a second movable range with respect to the second arm 2L that links the second joint portion 2Y and the third joint portion 3Y, and specifies a third movable range with respect to the third arm 3L linked to the third joint portion 3Y.

Also, the specification unit 122c calculates torque of a motor included in an actuator corresponding to each of the first joint portion 1Y, the second joint portion 2Y, and the third joint portion 3Y.

(About Determination Unit 122d)

On the basis of a surrounding environment of the robot device 100 and a condition of a utilized object (such as an instrument) used by the robot device 100 during a task, the determination unit 122d determines a risk of a case where the task is performed in a movable range calculated by the specification unit 122c. For example, on the basis of presence or absence of a person in a predetermined range from the robot device 100 as the surrounding environment of the robot device 100, the determination unit 122d determines a risk of a case where the task is performed in the movable range calculated by the specification unit 122c.

For example, the determination unit 122d determines that a risk is higher when a person becomes closer to the robot device 100. Also, for example, the determination unit 122d determines that a risk is high in a case where an instrument has an edged tool. Also, for example, the determination unit 122d determines that a risk is high in a case where an instrument is a firearm (such as a stove or the like).

Also, for example, the determination unit 122d determines a risk on the basis of contents of an instrument. For example, the determination unit 122d determines that a risk is high in a case where the contents of the instrument are alcohols or harmful substances. Also, for example, the determination unit 122d determines that a risk is high in a case where the robot device 100 handles hot water.

Note that the determination unit 122d may determine a risk by using an index that indicates a risk and that indicates, for example, how high the risk is. For example, in a case where there are five levels of values (such as 1 to 5) as index values indicating a risk, the determination unit 122d calculates an index value 1 in a case of determining that the risk is in the lowest rank (safe). On the one hand, the determination unit 122d calculates an index value 5 in a case of determining that the risk is in the highest rank.

(About Deciding Unit 122e)

On the basis of the risk determined by the determination unit 122d, the deciding unit 122e decides information related to handling of a utilized object used to execute a task. For example, the deciding unit 122e decides, as the information related to handling of the utilized object, a direction of the utilized object of when the utilized object is gripped which direction is a direction toward a person. For example, in a case where the utilized object is an edged tool, the deciding unit 122e decides a direction of a cutting edge and blade as an opposite direction of the person.

Also, as the information related to handling of the utilized object, the deciding unit 122e decides gripping force of when the utilized object is gripped. For example, the grip is required to be more stable when a risk of the utilized object becomes higher. Thus, the deciding unit 122e decides higher gripping force as the risk of the utilized object increases. However, depending on a utilized object, there is a possibility for a damage when the gripping force is too high. Thus, the deciding unit 122e decides optimum gripping force on the basis of a risk of a utilized object and what the utilized object is. For example, in the example of FIGS. 2A and 2B, the third arm 3L grips a utilized object. Thus, the deciding unit 122e decides gripping force with respect to the third arm 3L. Also, the deciding unit 122e transmits decision information indicating decided contents to the motion control unit 122f in such a manner that the arm 20 can be operated with the decided contents.

(About Motion Control Unit 122f)

The motion control unit 122f limits a movable range of a member by controlling a limitation portion corresponding to a predetermined joint portion on the basis of a task executed by the robot device 100. For example, the motion control unit 122f controls a stopper corresponding, as the predetermined joint portion, to a joint portion specified by the specification unit 122c on the basis of the task. Specifically, the motion control unit 122f controls a stopper corresponding, as the predetermined joint portion, to a joint portion specified by the specification unit 122c on the basis of information related to an object to be a target of the task. Specifically, the motion control unit 122f controls the stopper corresponding to the predetermined joint portion in such a manner as to move in a movable range specified by the specification unit 122c on the basis of the information related to the object to the target of the task.

Also, the motion control unit 122f controls the stopper corresponding to the predetermined joint portion in such a manner as to move in a movable range specified by the specification unit 122c on the basis of a surrounding environment of the robot of when the task is performed. Also, the motion control unit 122f controls the stopper corresponding to the predetermined joint portion in such a manner as to move in a movable range specified by the specification unit 122c on the basis of a risk of when the task is performed.

Also, the motion control unit 122f controls a movable range of when a link rotates around a predetermined axis by controlling a stopper corresponding, as the predetermined joint portion, to a joint portion that can rotate around the predetermined axis among joint portions that can rotate around at least one or more axes.

Also, by controlling the stopper, the motion control unit 122f limits the movable range of the link by causing the stopper and the link to come into contact with each other. That is, the motion control unit 122f limits the movable range of the link by locking the stopper to the link.

The above point will be described in more detail. The motion control unit 122f limits a movable range of an arm 20 by controlling a stopper corresponding to a predetermined joint portion on the basis of a task executed by the robot device 100. Specifically, the motion control unit 122f limits the movable range of the arm 20 by controlling the stopper via an actuator. For example, by controlling a stopper corresponding, as a predetermined joint portion, to a joint portion corresponding to a task, the motion control unit 122f limits a movable range of an arm 20 corresponding to the joint portion in such a manner that the arm 20 moves only in a movable range corresponding to the task.

For example, the motion control unit 122f limits the movable range of the arm 20 by locking the arm 20 to the stopper. For example, as illustrated in FIG. 2B, by linearly expanding and contracting the stopper and locking the arm 20, the motion control unit 122f limits the movable range of the arm 20 to a movable range corresponding to the task. Also, for example, as illustrated in FIG. 3B, the motion control unit 122f limits the movable range of the arm 20 to a movable range corresponding to the task by controlling a groove-like space between the stopper and a latch H included in the joint portion by a rotation of the stopper, and locking the arm 20 by an action of the stopper and the latch H forming the controlled groove-like space.

Also, an example in which the specification unit 122c specifies various parameters is illustrated. The motion control unit 122f controls a movable range of an arm 20 by controlling a stopper corresponding to a predetermined joint portion on the basis of the parameters specified by the specification unit 122c. For example, the specification unit 122c specifies a movable range of each arm 20, and the motion control unit 122f limits, for each arm 20, a movable range of the arm 20.

For example, in a case where the robot device 100 needs to move the first arm 1L in order to execute a given task, the motion control unit 122f limits a movable range of the first arm 1L to a first movable range by controlling stoppers ST1a and ST1b that are first stoppers corresponding to the first joint portion 1Y, as illustrated in FIGS. 3A and 3B. Also, for example, in a case where the robot device 100 needs to move the second arm 2L in order to execute a given task, the motion control unit 122f limits a movable range of the second arm 2L to a second movable range by controlling stoppers ST2a and ST2b that are second stoppers corresponding to the second joint portion 2Y, as illustrated in FIGS. 2A and 2B. Also, for example, in a case where the robot device 100 needs to move the third arm 3L in order to execute a given task, the motion control unit 122f limits a movable range of the third arm 3L to a third movable range by controlling stoppers ST3a and ST3b that are third stoppers corresponding to the third joint portion 3Y, as illustrated in FIGS. 2A and 2B.

(About Actuator 130)

The actuator 130 is mounted on each joint portion of the robot device 100, and controls motion of a link corresponding to the joint portion (such as an arm 20) by controlling driving of the joint portion. Also, the actuator 130 limits a movable range of the link by controlling a stopper. As illustrated in FIG. 4, the actuator 130 has a stopper that limits a movable range of the link.

Although not illustrated in FIG. 4, the actuator 130 includes a plurality of drive units provided for each axis such as a roll axis, a pitch axis, or a yaw axis in each joint portion. Then, each drive unit includes a combination of a motor that rotates around a predetermined axis, an encoder that detects a rotational position of the motor, and a driver that adaptively controls the rotational position and a rotation speed of the motor on the basis of an output of the encoder.

As described with reference to FIGS. 2A, 2B, 3A, and 3B, the actuator 130 includes an actuator 131-1a and an actuator 131-1b that are mounted on the first joint portion 1Y and that control a rotation around a pitch axis (pitch axis actuators 131-1), an actuator 131-2a and an actuator 131-2b that are mounted on the second joint portion 2Y and control a rotation around the pitch axis (pitch axis actuators 131-2), and an actuator 131-3a and an actuator 131-3b that are mounted on the third joint portion 3Y and control a rotation around the pitch axis (pitch axis actuators 131-3).

Also, in the pitch axis actuators 131-1, the actuator 131-1a limits a (clockwise) movable range around the pitch axis of the first arm 1L by controlling a stopper ST1a as illustrated in FIGS. 3A and 3B. In the pitch axis actuators 131-1, the actuator 131-1b limits a (counterclockwise) movable range around the pitch axis of the first arm 1L by controlling a stopper ST1b as illustrated in FIGS. 3A and 3B.

Also, in the pitch axis actuators 131-2, the actuator 131-2a limits a (clockwise) movable range around the pitch axis of the second arm 2L by controlling a stopper ST2a as illustrated in FIGS. 2A and 2B. In the pitch axis actuators 131-2, the actuator 131-2b limits a (counterclockwise) movable range around the pitch axis of the second arm 2L by controlling a stopper ST2b as illustrated in FIGS. 2A and 2B.

Also, in the pitch axis actuators 131-2, the actuator 131-2a limits a (clockwise) movable range around the pitch axis of the second arm 2L by controlling a stopper ST2a as illustrated in FIGS. 2A and 2B. In the pitch axis actuators 131-2, the actuator 131-2b limits a (counterclockwise) movable range around the pitch axis of the second arm 2L by controlling a stopper ST2b as illustrated in FIGS. 2A and 2B.

Also, in the pitch axis actuators 131-3, the actuator 131-3a limits a (clockwise) movable range around the pitch axis of the third arm 3L by controlling a stopper ST3a as illustrated in FIGS. 2A and 2B. In the pitch axis actuators 131-3, the actuator 131-3b limits a (counterclockwise) movable range around the pitch axis of the third arm 3L by controlling a stopper ST3b as illustrated in FIGS. 2A and 2B.

Figure 6A:
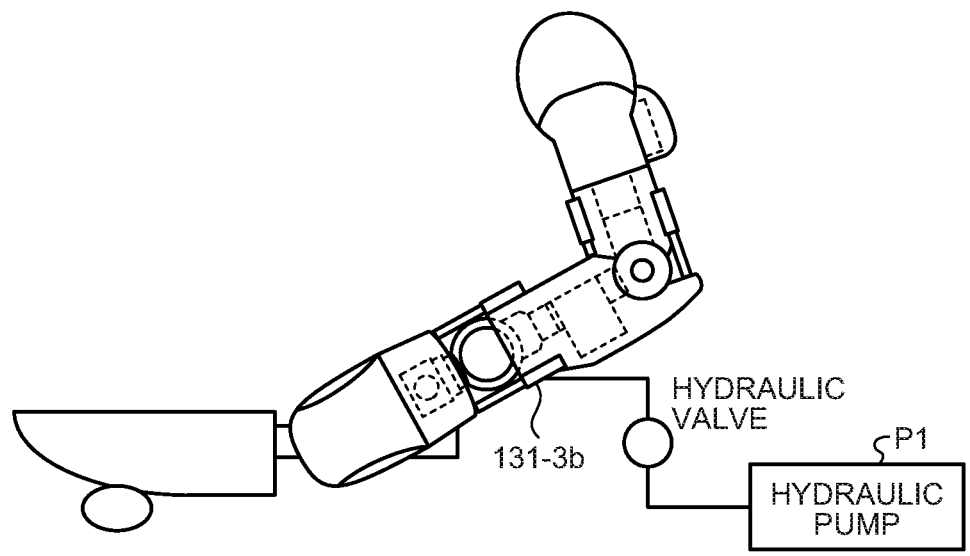
FIGS. 6A and 6B are views illustrating an example of a drive source that realizes movement of a motor included in an actuator of the present disclosure.
Figure 6B:
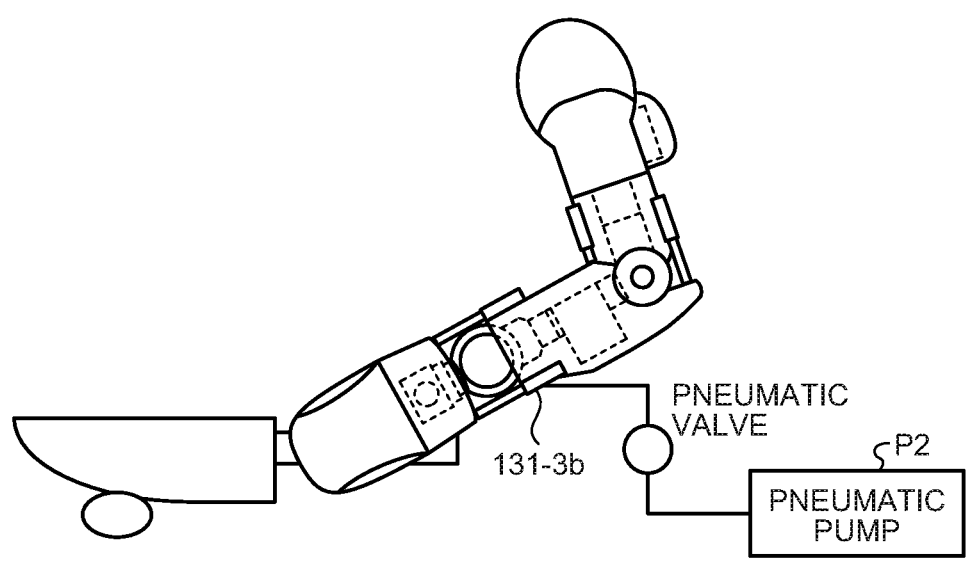

Here, a drive source to drive the actuator 130 will be described with reference to FIGS. 6A and 6B. FIGS. 6A and 6B are views illustrating an example of a drive source that realizes movement of a motor included in the actuator 130. A hydraulic pump or a pneumatic pump is used as the drive source that realizes movement of the motor included in the actuator 130. Any of these may be employed for the actuator 130 according to the embodiment.

In an example of FIG. 6A, a hydraulic pump P1 is connected to the actuator 131-3b. For example, a transmitter or an engine is mounted on the robot device 100, and the transmitter or the engine drives the hydraulic pump P1. Then, the hydraulic pump P1 supplies a hydraulic pressure to the actuator 131-3b. A motor of the actuator 131-3b performs, for example, rotational movement by this hydraulic pressure. Note that the hydraulic pump P1 is connected only to the actuator 131-3b but also to the actuator 131-1a, the actuator 131-1b, the actuator 131-2a, the actuator 131-2b, and the actuator 131-3a.

Also, in an example of FIG. 6B, a pneumatic pump P2 is connected to the actuator 131-3b. For example, a transmitter or an engine is mounted on the robot device 100, and the transmitter or the engine drives the pneumatic pump P2. Then, the pneumatic pump P2 supplies pneumatic pressure to the actuator 131-3b. A motor of the actuator 131-3b performs, for example, rotational movement by this pneumatic pressure. Note that the pneumatic pump P2 is connected not only to the actuator 131-3b but also to the actuator 131-1a, the actuator 131-1b, the actuator 131-2a, the actuator 131-2b, and the actuator 131-3a.

4. Example of control processing

Now, an example of control processing according to the embodiment will be described in the following. Specifically, an example of control processing executed by the control device 120 will be described. In the following, an example of the control processing according to the embodiment will be described with reference to FIGS. 2A, 2B, 3A, and 3B. Here, it is assumed that control processing by the control device 120 of a case where the robot device 100 performs a task T3 among tasks T1 to T4 illustrated in FIG. 5 is illustrated as an example. Note that although the task T3 is picked up and described here, control processing performed by the control device 120 is the same for the other tasks. Also, it is assumed that the robot device 100 already places an object O1 (carrot) to be a target of the task T3 on a working table by a task (such as tasks T1 and T2) before the task T3.

First, it is assumed that the reception unit 122a receives an instruction of the task T3 from a user. In such a case, the recognition unit 122b recognizes an environment around the robot device 100 on the basis of environmental information acquired by the imaging unit 110a and a distance acquired by a distance sensor. Then, the recognition unit 122b transmits the environmental information acquired by the recognition to the specification unit 122c.

Next, on the basis of the task T3, the specification unit 122c specifies a joint portion to be driven in the task T3 among parts of the robot device 100. Here, it is assumed that the specification unit 122c specifies the first joint portion 1Y, the second joint portion 2Y, and the third joint portion 3Y. Note that this can be also said that the specification unit 122c specifies the first arm 1L, the second arm 2L, and the third arm 3L as arms 20 to be driven in the task T3 on the basis of the task T3.

Also, the specification unit 122c specifies, as a parameter, information related to the object to be the target of the task T3 on the basis of contents of the task T3 and the environmental information. For example, the specification unit 122c specifies, as the information related to the object to be the target of the task T3, at least a name of the object, size of the object, strength of the object, rigidity of the object, weight of the object, and a target value to be achieved for the object. The object in the task T3 is "carrot". Thus, the specification unit 122c specifies the object being carrot, a size of the carrot, strength of the carrot, rigidity of the carrot, weight of the carrot, and how much the carrot is cut (example of a target value to be achieved for the object).

Also, on the basis of the specified information related to the object, the specification unit 122c calculates (specifies) movable ranges of the arms 20 which ranges are movable ranges necessary for execution of the task T3, and torque necessary for execution of the task T3. Specifically, the specification unit 122c calculates (specifies) a movable range necessary for execution of the task T3 and torque necessary for execution of the task T3 for each of the first arm 1L, the second arm 2L, and the third arm 3L on the basis of the specified information related to the object and the environmental information.

For example, the specification unit 122c calculates the movable ranges with reference to the task information storage unit 121a. For example, the specification unit 122c extracts a movable range in each axis to which movable range a task ID "T3" is associated among movable ranges (rotation angle ranges) in each axis which ranges are stored in the task information storage unit 121a.

In the example of FIG. 5, the specification unit 122c specifies "0 deg to 25 deg" as a movable range around the pitch axis, "0 deg to 0 deg" as a movable range around the roll axis, and "0 deg to 0 deg" as a movable range around the yaw axis with respect to the first arm 1L. Also, the specification unit 122c specifies "70 deg to 90 deg" as a movable range around the pitch axis, "0 deg to 0 deg" as a movable range around the roll axis, and "0 deg to 0 deg" as a movable range around the yaw axis with respect to the second arm 2L. Also, the specification unit 122c specifies "0 deg to 0 deg" as a movable range around the pitch axis, "0 deg to 0 deg"

as a movable range around the roll axis, and "0 deg to 0 deg" as a movable range around the yaw axis with respect to the third arm 3L.

Here, for example, in a case where a human performs work of cutting with a kitchen knife, a wrist is hardly moved while an upper arm and a forearm are mainly moved up and down finely. In accordance with this, the specification unit 122c calculates the movable ranges described above. That is, the movable range around the pitch axis in the first arm 1L corresponding to the upper arm can be a relatively narrow range such as "0 deg to 25 deg" (because of small work). Similarly, the movable range around the pitch axis in the second arm 2L corresponding to the forearm can be a relatively narrow range such as "70 deg to 90 deg" (because of small work). Also, since the third arm 3L corresponding to a palm (wrist) does not need to be moved much, the movable range around the pitch axis can be "0 deg to 0 deg".

Also, in a case where a human performs work of cutting with a kitchen knife, an arm is not rolled nor moved to the right and left (arm only needs to be moved up and down in the cutting work). In accordance with this, the specification unit 122c calculates the movable ranges described above. That is, since motions around the roll axis and the yaw axis in the first arm 1L corresponding to the upper arm are unnecessary in the cutting work, the movable range can be "0 deg to 0 deg" (completely locked). Similarly, since motions around the roll axis and the yaw axis in the second arm 2L corresponding to the forearm are unnecessary in the cutting work, the movable range can be "0 deg to 0 deg" (completely locked). Similarly, since motions around the roll axis and the yaw axis in the third arm 3L corresponding to the palm are unnecessary in the cutting work, the movable range can be "0 deg to 0 deg" (completely locked).

Also, instead of employing a movable range stored in the task information storage unit 121a as it is, the specification unit 122c may add an adjustment such as narrowing an extracted movable range on the basis of the movable range extracted from the task information storage unit 121a and environmental information. Also, the specification unit 122c may calculate a movable range without using the movable range stored in the task information storage unit 121a.

Then, the specification unit 122c transmits information indicating the specified movable range and torque to the motion control unit 122f. The motion control unit 122f limits the movable ranges of the arms 20 by controlling stoppers corresponding to the task T3 on the basis of the information acquired from the specification unit 122c. Specifically, the motion control unit 122f calculates control information such as how to move the stoppers to acquire the movable ranges specified by the specification unit 122c on the basis of the information acquired from the specification unit 122c, and controls the actuator 130 in such a manner that the stoppers are moved according to the calculated control information.

First, limitation of a movable range of the first arm 1L will be described. For example, the motion control unit 122f calculates control information X1a indicating how much distance the stopper ST1a is to be rotationally moved around the pitch axis (clockwise) to acquire "0 deg to 25 deg" as a movable range of the first arm 1L around the pitch axis by a width of a groove-like structure SP1a adjusted by the rotational movement. Also, the motion control unit 122f calculates control information X1b indicating how much distance the stopper ST1b is to be rotationally moved around the pitch axis (counterclockwise) to acquire "0 deg to 25 deg" as a movable range of the first arm 1L around the pitch axis by a width of a groove-like structure SP1b adjusted by the rotational movement.

Then, by transmitting the calculated control information X1a and control information X1b to the pitch axis actuators 131-1, the motion control unit 122f controls the pitch axis actuators 131-1 to rotationally move the stoppers ST1a and ST1b according to the control information X1a and the control information X1b.

For example, by transmitting the calculated control information X1a to the actuator 131-1a, the motion control unit 122f controls the actuator 131-1a to rotationally move the stopper ST1a according to the control information X1a. When receiving the control information X1a, the actuator 131-1a rotationally moves the stopper ST1a clockwise according to the received control information X1a. For example, by transmitting the calculated control information X1b to the actuator 131-1b, the motion control unit 122f controls the actuator 131-1b to rotationally move the stopper ST1b according to the control information X1b. When receiving the control information X1b, the actuator 131-1b rotationally moves the stopper ST1b counterclockwise according to the received control information X1b.

Thus, for example, even in a case where external force is applied to the first arm 1L and there is a possibility that the first arm 1L rotates around the pitch axis (clockwise) beyond "25 deg", the first arm 1L can rotate only in a range of the width of the groove-like structure SP1a formed by the stopper ST1a and the latch H due to a contact between the stopper ST1a and the latch H. That is, the stopper ST1a and the latch H come into contact with each other in such a manner that the first arm 1L does not rotate around the pitch axis (clockwise) beyond "25 deg". Also, even in a case where external force is applied to the first arm 1L and there is a possibility that the first arm 1L rotates around the pitch axis (counterclockwise) beyond "0 deg", the first arm 1L can rotate only in a range of the width of the groove-like structure SP1b formed by the stopper ST1b and the latch H due to a contact between the stopper ST1b and the latch H. That is, the stopper ST1b and the latch H come into contact with each other in such a manner that the first arm 1L does not rotate around the pitch axis (clockwise) beyond "0 deg".

Also, to the pitch axis actuators 131-1, the motion control unit 122f transmits torque information of when the first joint portion 1Y is driven.

Next, limitation of a movable range of the second arm 2L will be described. For example, the motion control unit 122f calculates control information X2a indicating how much distance the stopper ST2a is to be extended in a linear direction to lock an upper end of the second arm 2L by the extended stopper ST2a in a manner illustrated in FIG. 2(b) and to acquire "70 deg to 90 deg" as a movable range of the second arm 2L around the pitch axis. Also, the motion control unit 122f calculates control information X2b indicating how much distance the stopper ST2b is to be extended in the linear direction to lock a lower end of the second arm 2L by the extended stopper ST2b in a manner illustrated in FIG. 2B and to acquire "70 deg to 90 deg" as a movable range of the second arm 2L around the pitch axis.

Then, by transmitting the calculated control information X2a and control information X2b to the pitch axis actuators 131-2, the motion control unit 122f controls the pitch axis actuators 131-2 to rotationally move the stoppers ST2a and ST2b according to the control information X2a and the control information X2b.

For example, by transmitting the calculated control information X2a to the actuator 131-2a, the motion control unit 122f controls the actuator 131-2a to extend the stopper ST2a according to the control information X2a. When receiving the control information X2a, the actuator 131-2a extends the stopper ST2*a* straight according to the received control information X2*a*. For example, by transmitting the calculated control information X2*b* to the actuator 131-2*b*, the motion control unit 122*f* controls the actuator 131-2*b* to extend the stopper ST2*b* according to the control information X2*b*. When receiving the control information X2*b*, the actuator 131-2*b* extends the stopper ST2*a* straight according to the received control information X2*a*.

Thus, for example, even in a case where external force is applied to the second arm 2L and there is a possibility that the second arm 2L rotates around the pitch axis (clockwise) beyond "90 deg", the stopper ST2*a* functions as a prop and physically performs locking. That is, the stopper ST2*a* locks the second arm 2L by applying physical force to the second arm 2L in a direction in which the second arm 2L is prevented from rotating around the pitch axis (clockwise) beyond "90 deg". As a result, for example, even in a case where external force is applied to the second arm 2L and there is a possibility that the second arm 2L rotates around the pitch axis (counterclockwise) beyond "70 deg", the stopper ST2*b* functions as a prop and physically performs locking. That is, the stopper ST2*b* locks the second arm 2L by applying physical force to the second arm 2L in a direction in which the second arm 2L is prevented from rotating around the pitch axis (counterclockwise) beyond "70 deg".

Next, limitation of a movable range of the third arm 3L will be described. For example, the motion control unit 122*f* calculates control information X3*a* indicating how much distance the stopper ST3*a* is to be extended in a linear direction to lock an upper end of the third arm 3L by the extended stopper ST3*a* in a manner illustrated in FIG. 2B and to acquire "0 deg to 0 deg" as a movable range of the third arm 3L around the pitch axis. Also, the motion control unit 122*f* calculates control information X3*b* indicating how much distance the stopper ST3*b* is to be extended in a linear direction to lock a lower end of the third arm 3L by the extended stopper ST3*b* in a manner illustrated in FIG. 2B and to acquire "0 deg to 0 deg" as a movable range of the third arm 3L around the pitch axis.

Then, by transmitting the calculated control information X3*a* and control information X3*b* to the pitch axis actuators 131-3, the motion control unit 122*f* controls the pitch axis actuators 131-3 to rotationally move the stoppers ST3*a* and ST3*b* according to the control information X3*a* and control information X3*b*.

For example, by transmitting the calculated control information X3*a* to the actuator 131-3*a*, the motion control unit 122*f* controls the actuator 131-3*a* to extend the stopper ST3*a* according to the control information X3*a*. When receiving the control information X3*a*, the actuator 131-3*a* extends the stopper ST3*a* straight according to the received control information X3*a*. Also, by transmitting the calculated control information X3*b* to the actuator 131-3*b*, the motion control unit 122*f* controls the actuator 131-3*b* to extend the stopper ST3*b* according to the control information X3*b*. When receiving the control information X3*b*, the actuator 131-3*b* extends the stopper ST3*b* straight according to the received control information X3*b*.

Thus, for example, even in a case where external force is applied to the third arm 3L and there is a possibility that the third arm 3L rotates around the pitch axis (clockwise) beyond "0 deg", the stopper ST3*a* functions as a prop and physically performs locking. That is, the stopper ST3*a* locks the third arm 3L by applying physical force to the third arm 3L in a direction in which the third arm 3L is prevented from rotating around the pitch axis (clockwise) beyond "0 deg".

Also, for example, even in a case where external force is applied to the third arm 3L and there is a possibility that the third arm 3L rotates around the pitch axis (counterclockwise) beyond "0 deg", the stopper ST3*b* functions as a prop and physically performs locking. That is, the stopper ST3*b* locks the third arm 3L by applying physical force to the third arm 3L in a direction in which the third arm 3L is prevented from rotating around the pitch axis (counterclockwise) beyond "0 deg".

Also, the robot device 100 executes the task T3 when the control processing by the actuator 130 is completed. Specifically, the robot device 100 grips a kitchen knife, which is an instrument E1, and performs work of cutting an object O1 with the instrument E1. Here, it is assumed that force generated by torque (rotational force of a motor) necessary to cut the object O1 (carrot), that is, force to cut the object O1 is T1(N). On the one hand, it is assumed that reaction force that an arm 20 receives from the object O1 via the instrument E1 (kitchen knife) is T2(N) when the object O1 is cut. It is also assumed that T1<T2 is satisfied.

In order to simplify the description, the focus is placed only on the stopper ST3*a*. Also, a case where motion of the third arm 3L is not locked by the stopper ST3*a* is assumed. Then, since T1<T2 is satisfied, torque of a motor that rotationally drives the third joint portion 3Y corresponding to the third arm 3L cannot withstand T2, and there is a possibility that the third arm 3L moves in a direction indicated, for example, by a dotted arrow illustrated in FIG. 2B. In such a case, it is impossible to cut the object O1, and a cutting edge of the instrument E1 faces upward and there is danger.

On the one hand, as illustrated in FIG. 2B, it is assumed that motion of the third arm 3L is locked by the stopper ST3*a*. Similarly, torque of the motor that rotationally drives the third joint portion 3Y corresponding to the third arm 3L cannot withstand T2, and the third arm 3L tries to move in the direction indicated, for example, by the dotted arrow illustrated in FIG. 2B. However, the stopper ST3*a* locks the third arm 3L in such a manner as to prevent such a motion. In such a case, by applying force to the third arm 3L in a direction of repelling the force that is in the direction of the dotted arrow, the stopper ST3*a* contributes to further giving auxiliary force to the force for the third arm 3L to cut the object O1. Thus, the force generated when the stopper ST3*a* locks the motion of the third arm 3L is applied, and the object O1 can be cut with force smaller than T1. This means that the torque of the motor to rotationally drive the third joint portion 3Y can be smaller.

In such a manner, when torque necessary to execute a task becomes small by a role of the stopper, the motor can be further downsized. Also, for example, since it is possible to eliminate a condition in which a cutting edge faces a wrong direction, it becomes possible to secure safety. Also, as described above, a movable range of an arm 20 is controlled on software and motion is physically limited by actual utilization of a stopper. Thus, double safety measures that are limitation by information processing by the software and physical limitation by the stopper can be realized.

In summary, the control device 120 according to the embodiment can secure safety for surroundings of when a robot executes a task. Specifically, the control device 120 can realize double safety measures by software and a stopper (hardware). Also, the control device 120 can contribute to downsizing of a motor in a joint portion. Thus, for example, downsizing of the actuator 130 itself can be realized in a case where the actuator 130 has such a motor.

5. Processing Procedure

Next, a procedure of information processing according to the embodiment will be described with reference to FIG. 7. FIG. 7 is a flowchart illustrating an information processing procedure according to the embodiment.

First, the reception unit 122a determines whether a task is received from a user (Step S101). In a case of determining that no task is received (Step S101; No), the reception unit 122a waits until a task is received. On the one hand, in a case where a task is received by the reception unit 122a (Step S101; Yes), the recognition unit 122b acquires imaging information captured by the imaging unit 110a and sensor information detected by the distance sensor 110d (Step S102).

Next, the recognition unit 122b recognizes a surrounding environment of the robot device 100 on the basis of the acquired information (Step S103). The recognition unit 122b also recognizes an object to be a target of the task (Step S103).

Next, the specification unit 122c specifies information related to the object to be the target of the task (Step S104). For example, as the information related to the object to be the target of the task, the specification unit 122c specifies at least a name of the object, size of the object, strength of the object, rigidity of the object, weight of the object, and a target value for the object.

Next, on the basis on the task, the specification unit 122c specifies a joint portion that needs to be operated to execute the task among joint portions included in the robot device 100 (Step S105). For example, on the basis of the information related to the object to be the target of the task which information is specified in Step S104, the specification unit 122c specifies a joint portion that needs to be operated to execute the task among the joint portions included in the robot device 100.

Next, on the basis of the task, for each link (arm 20) corresponding to the joint portion specified in Step S105, a movable range necessary to execute the task is calculated, and torque necessary to execute the task (torque to drive the joint portion specified in Step S105) is calculated (Step S106). For example, the specification unit 122c calculates the movable range and torque on the basis of the information related to the object which information is specified in Step S104.

Then, the motion control unit 122f limits the movable range of the link by controlling a stopper (limitation portion) corresponding to a predetermined joint portion (Step S107). Specifically, the motion control unit 122f controls a stopper corresponding, as the predetermined joint portion, to a joint portion specified by the specification unit 122c on the basis of the information related to the object to be the target of the task. Also, the motion control unit 122f controls the stopper corresponding to the predetermined joint portion in such a manner as to move in the movable range specified by the specification unit 122c on the basis of the information related to the object to be the target of the task.

For example, the motion control unit 122f calculates control information indicating how the stopper is to be moved in such a manner that the movable range of the link is operated only in the movable range specified in Step S106. Then, the motion control unit 122f controls the actuator 130 in such a manner as to move the stopper with the calculated control information. The actuator 130 moves the stopper according to the control information received from the motion control unit 122f.

Although not illustrated in FIG. 7, the control device 120 may instruct the robot device 100 to execute the task in a case where the control processing in Step S107 is ended. For example, the control device 120 can instruct the robot device 100 to handle a utilized object with information decided by the deciding unit 122e. For example, the control device 120 can give the robot device 100 an instruction of a direction of the utilized object or gripping force.

As described above, each component of each of the illustrated devices is a functional concept, and does not need to be physically configured in a manner illustrated in the drawings. That is, a specific form of distribution/integration of each device is not limited to what is illustrated in the drawings, and a whole or part thereof can be functionally or physically distributed/integrated in an arbitrary unit according to various loads and usage conditions.

Also, although an embodiment of the present application has been described in detail with reference to some drawings, these are examples. The present invention can be performed in different forms in which various modifications and improvements are made on the basis of knowledge of those skilled in the art, and which include the embodiment described in a column of disclosure of the invention.

Also, an effect in an embodiment described in the present description is merely an example and is not a limitation, and there may be a different effect.

Note that the present disclosure may also include the following configurations.

REFERENCE SIGNS LIST

100 ROBOT DEVICE
110 INPUT/OUTPUT UNIT
120 CONTROL DEVICE
130 ACTUATOR
131-1 PITCH AXIS ACTUATOR
131-2 PITCH AXIS ACTUATOR
131-3 PITCH AXIS ACTUATOR
1Y FIRST JOINT PORTION
2Y SECOND JOINT PORTION
3Y THIRD JOINT PORTION
1L FIRST ARM
2L SECOND ARM
3L THIRD ARM
ST1a STOPPER
ST1b STOPPER
ST2a STOPPER
ST2b STOPPER
ST3a STOPPER
ST3b STOPPER

The invention claimed is:

1. A control method, comprising:
   physically limiting a motion of a first link of at least two links of a plurality of links of a robot, wherein a stopper is in a first joint portion, of plurality of joint portions, which joins the at least two links of the plurality of links;
   determining a first moveable range of the first link based on a risk associated with use of an instrument for a task by the robot, wherein the instrument used for the task is different from the robot; and
   controlling the stopper corresponding to the first joint portion, to move the first link within the determined first movable range.

2. A non-transitory computer-readable storage medium having stored thereon, computer-executable instructions which, when executed by a processor, cause the processor to execute operations, the operations comprising:
- physically limiting a motion of a first link of at least two links of a plurality of links of a robot, wherein a stopper is in a first joint portion, of plurality of joint portions, which joins the at least two links of the plurality of links;
- determining a first moveable range of the first link based on a risk associated with using of an instrument for a task by the robot, wherein the instrument used for the task is different from the robot; and
- controlling the stopper corresponding to the first joint portion, to move the first link within the determined first movable range.

3. A control device, comprising:
- a stopper in a first joint portion of a plurality of joint portions, wherein
  - the first joint portion is configured to join at least two links of a plurality of links of a robot, and
  - the stopper is configured to physically limit a motion of a first link of the at least two links; and
- a control unit configured to:
  - determine a first movable range of the first link based on a risk associated with use of an instrument for a task by the robot, wherein the instrument used for the task is different from the robot; and
  - control the stopper corresponding to the first joint portion, to move the first link within the determined first movable range.

4. The control device according to claim 3, wherein the control unit is further configured to determine the first joint portion among the plurality of joint portions based on the task.

5. The control device according to claim 4, wherein the control unit is further configured to determine the first joint portion among the plurality of joint portions based on information related to an object to be a target of the task.

6. The control device according to claim 3, wherein the control unit is further configured to determine the first movable range based on information related to an object to be a target of the task.

7. The control device according to claim 5, wherein the information, related to the object to be the target of the task, includes at least one of a name of the object, a size of the object, a strength of the object, a rigidity of the object, a weight of the object, or a target value for the object.

8. The control device according to claim 3, wherein
- the plurality of joint portions rotate around at least one axis of a plurality of axes;
- the first joint portion rotates around a first axis of the plurality of axes; and
- the control unit is further configured to limit the first movable range of the first link based on the rotation of the first joint portion around the first axis.

9. The control device according to claim 3, wherein the control unit is further configured to determine the first movable range based on a surrounding environment of the robot in a case the task is executed by the robot in the surrounding environment.

10. The control device according to claim 3, wherein the control unit is further configured to limit the first movable range of the first link by locking the first link to the stopper.

* * * * *